(12) United States Patent
Lim et al.

(10) Patent No.: US 11,321,651 B2
(45) Date of Patent: May 3, 2022

(54) CYCLE AND SAFETY STOCK DETERMINATION SYSTEMS

(71) Applicant: COUPANG CORP., Seoul (KR)

(72) Inventors: Kyuhoon Lim, Seoul (KR); Hyeong Bae Yang, Suwon (KR); Rajesh Medidhi, Seoul (KR); Smita Mohan, Seoul (KR); Je Kim, Seattle, WA (US)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 16/730,051

(22) Filed: Dec. 30, 2019

(65) Prior Publication Data
US 2021/0201235 A1  Jul. 1, 2021

(51) Int. Cl.
G06Q 10/06 (2012.01)
G06Q 10/08 (2012.01)
G06Q 30/02 (2012.01)

(52) U.S. Cl.
CPC ..... *G06Q 10/06315* (2013.01); *G06Q 10/087* (2013.01)

(58) Field of Classification Search
CPC ......... G06Q 10/06; G06Q 10/08; G06Q 30/02
USPC ...................................... 705/7.25
See application file for complete search history.

(56) References Cited

U.S. PATENT DOCUMENTS

| | | | |
|---|---|---|---|
| 9,776,810 B2 | 10/2017 | Collombet et al. | |
| 2005/0288989 A1 | 12/2005 | Kim et al. | |
| 2007/0016494 A1 | 1/2007 | Brown et al. | |
| 2008/0086392 A1* | 4/2008 | Bishop | G06Q 10/08 705/28 |

(Continued)

FOREIGN PATENT DOCUMENTS

| | | |
|---|---|---|
| CN | 108140163 A | 6/2018 |
| CN | 108780529 A | 9/2018 |

(Continued)

OTHER PUBLICATIONS

Notice of Preliminary Rejection dated Jan. 24, 2021, by Korean Intellectual Property Office in Korean Patent Application No. 10-2020-0015881 (16 pages).

(Continued)

*Primary Examiner* — Nga B Nguyen
(74) *Attorney, Agent, or Firm* — Finnegan, Henderson, Farabow, Garrett & Dunner, LLP

(57) ABSTRACT

Disclosed are methods and systems for intelligent distribution of products. In one aspect, a system comprises a memory storing instructions and at least one processor configured to execute the instructions. The processor performs operations include receiving forecasting data comprising an expected demand of a stock keeping unit and determining a target inventory of the SKU to satisfy the expected demand. The operations further include determining a regional target inventory of the SKU of a region comprising a plurality of fulfillment centers. The operations further comprise receiving historical data comprising the inbound and outbound shipment history of a fulfillment center in the plurality of fulfillment centers and generating a profile for the fulfillment center. The operations further comprise assigning a portion of the regional target inventory to the fulfillment center and transmitting instructions to a device to stock a number of SKUs in the fulfillment center based on the portion.

20 Claims, 9 Drawing Sheets

(56) References Cited

U.S. PATENT DOCUMENTS

| | | |
|---|---|---|
| 2008/0162270 A1 | 7/2008 | Kim et al. |
| 2011/0054984 A1 | 3/2011 | Bateni |
| 2013/0218799 A1 | 8/2013 | Lehmann et al. |
| 2017/0068973 A1 | 3/2017 | Sinkel |
| 2018/0247360 A1 | 8/2018 | Baxter et al. |
| 2018/0253680 A1* | 9/2018 | Jahani .................. G06Q 10/087 |
| 2018/0276695 A1* | 9/2018 | Dione .................... G06N 20/10 |
| 2019/0130425 A1* | 5/2019 | Lei ...................... G06Q 10/0631 |
| 2019/0188536 A1* | 6/2019 | Lei ...................... G06Q 30/0202 |
| 2019/0347606 A1 | 11/2019 | Malecha et al. |
| 2020/0111109 A1* | 4/2020 | Lei .......................... G06N 20/10 |
| 2020/0175461 A1* | 6/2020 | Lu ........................... G06Q 10/04 |
| 2021/0110461 A1* | 4/2021 | Wang .................. G06Q 10/087 |

FOREIGN PATENT DOCUMENTS

| | | |
|---|---|---|
| CN | 109146350 A | 1/2019 |
| CN | 110062740 A | 7/2019 |
| EP | 3 534 318 A1 | 9/2019 |
| JP | 2006-171856 | 6/2006 |
| KR | 20140144282 A | 12/2014 |
| KR | 10-2018-0126063 A | 11/2018 |
| KR | 10-1974312 | 4/2019 |
| TW | 200713110 A | 4/2007 |
| TW | 201336740 A | 9/2013 |
| TW | 201936464 A | 9/2019 |

OTHER PUBLICATIONS

First Examination Report dated Dec. 17, 2020, by IP Australia in Australian Patent Application No. 2020264288 (8 pages).

Online reference "What is fulfilment, and why are Shinsegae and Naver crazy about it?" (Dec. 12, 2018) (9 pages).

Office Action dated May 14, 2021 by the Taiwan Intellectual Property Office in R.O.C. Patent Application No. 109134864 (6 pages).

Notice of Preliminary Rejection dated Jun. 24, 2021, by the Korean Intellectual Property Office in counterpart KR Patent Application No. 10-2020-0015881 (16 pages).

Notice of Allowance dated Nov. 12, 2021, by the Korean Intellectual Property Office in counterpart KR Patent Application No. 10-2020-0015881, dated Nov. 12, 2021, 2 pp.

Examination Notice dated Oct. 18, 2021, by the Hong Kong Intellectual Property Office in counterpart HK Patent Application No. 22020017729.7 (5 pages).

Office Action dated Jan. 14, 2022, by the Taiwanese Patent Office in counterpart Taiwanese Application No. 110148892, 6 pages.

\* cited by examiner

CYCLE AND SAFETY STOCK DETERMINATION SYSTEMS

TECHNICAL FIELD

The present disclosure generally relates to computerized systems and methods for intelligently distributing products by determining cycle and safety stock for multiple fulfillment centers (FCs). In particular, embodiments of the present disclosure relate to inventive and unconventional systems related to distributing products across multiple FCs based on a regional target inventory and generated profiles of each FC.

BACKGROUND

Fulfillment centers (FCs) encounter more than millions of products daily as they operate to fulfill consumer orders as soon as the orders are placed and enable shipping carriers to pick up shipments. Operations for managing inventory inside FCs may include receiving merchandise from sellers, stowing the received merchandise for easy picking access, packing the items, verifying the order, and package delivery. Although currently existing FCs and systems for inventory management in FCs are configured to handle large volumes of incoming and outgoing merchandise, a common issue arises when a FC receives more than can be handled orders because orders are not distributed adequately among multiple FCs. For example, a merchant associated with FCs may order large volumes of products from suppliers for a peak season, but the FCs do not have sufficient resources to receive the ordered products in timely manner. This leads to massive backlog problems at the FCs by slowing down the receiving process, which may eventually exacerbate the problems. The backlog problems may result a loss in sales because it hampers the merchant from circulating products to make profits.

To mitigate such problems, conventional inventory management systems rely solely on forecast data to determine the distribution of products to multiple FCs. These systems suffer from technical problems in that they do not factor in the individual capabilities of each FC, such as their inbound capacity or outbound capacity for the particular product. Without taking these factors into consideration, these systems may generate a distribution of products among the FCs, where a particular FC may not have enough inventory, inbound capacity, or outbound capacity to meet the demand for a particular product. This may also result in a loss of sales.

Therefore, there is a need for improved methods and systems for intelligently distributing products to a plurality of FCs that are further based on the distinct capabilities and traits of each FC.

SUMMARY

One aspect of the present disclosure is directed to a computer-implemented system for intelligent distribution of products. The system may include: a memory storing instructions; and at least one processor configured to execute the instructions for: receiving forecasting data including an expected demand of a stock keeping unit (SKU); determining, based on the received forecasting data, a target inventory of the SKU to satisfy the expected demand, the target inventory including: a cycle stock for the SKU; and a safety stock for the SKU; determining, based on the target inventory of the SKU, a regional target inventory of the SKU of a region including a plurality of fulfillment centers, the regional target inventory including: a regional cycle stock for the SKU; and a regional safety stock for the SKU; receiving historical data including the inbound and outbound shipment history of a fulfillment center in the plurality of fulfillment centers; generating, based on the received data, a profile for the fulfillment center, the profile including: an inbound capacity; an outbound capacity; and a current inventory of the SKU; assigning, based on the profile of the fulfillment center, a portion of the regional target inventory to the fulfillment center; and transmitting instructions to another device to stock a number of SKUs in the fulfillment center based on the portion.

Another aspect of the present disclosure is directed to a computer-implemented method for intelligent distribution of products. The method may include: receiving forecasting data including an expected demand of a stock keeping unit (SKU); determining, based on the received forecasting data, a target inventory of the SKU to satisfy the expected demand, the target inventory including: a cycle stock for the SKU; and a safety stock for the SKU; determining, based on the target inventory of the SKU, a regional target inventory of the SKU of a region including a plurality of fulfillment centers, the regional target inventory including: a regional cycle stock for the SKU; and a regional safety stock for the SKU; receiving historical data including the inbound and outbound shipment history of a fulfillment center in the plurality of fulfillment centers; generating, based on the received data, a profile for the fulfillment center in the plurality of fulfillment centers, the profile including: an inbound capacity; an outbound capacity; and a current inventory of the SKU; assigning, based on the profile of the fulfillment center, a portion of the regional target inventory to the fulfillment center; and transmitting instructions to stock a number of SKUs in the fulfillment center based on the portion.

Yet another aspect of the present disclosure is directed to a computer-implemented system for intelligent distribution of products, the system may include: a memory storing instructions; and at least one processor configured to execute the instructions for: receiving forecasting data including an expected demand of a stock keeping unit (SKU); determining, based on the received forecasting data, a target inventory of the SKU to satisfy the expected demand, the target inventory including: a cycle stock for the SKU; and a safety stock for the SKU. determining, based on the target inventory of the SKU, a regional target inventory of the SKU of a region including a plurality of fulfillment centers, the regional target inventory including: a regional cycle stock for the SKU; and a regional safety stock for the SKU; receiving historical data including the inbound and outbound shipment history of a fulfillment center in the plurality of fulfillment centers; generating, based on the received data, a profile for the fulfillment center, the profile including: an inbound capacity; an outbound capacity; and a current inventory of the SKU; assigning, based on the profile of the fulfillment center, a portion of the regional target inventory to the fulfillment center; determining, based on the current inventory of the SKU and the portion, whether the current inventory of the SKU meets the assigned portion; and based on a determination that the current inventory does not meet the assigned portion, transmitting instructions to another device to modify or maintain one or both of an inbound flow and an outbound flow of a SKU at the fulfillment center until the current inventory of the SKU meets the assigned portion.

Other systems, methods, and computer-readable media are also discussed herein.

DETAILED DESCRIPTION

Figure 1A:
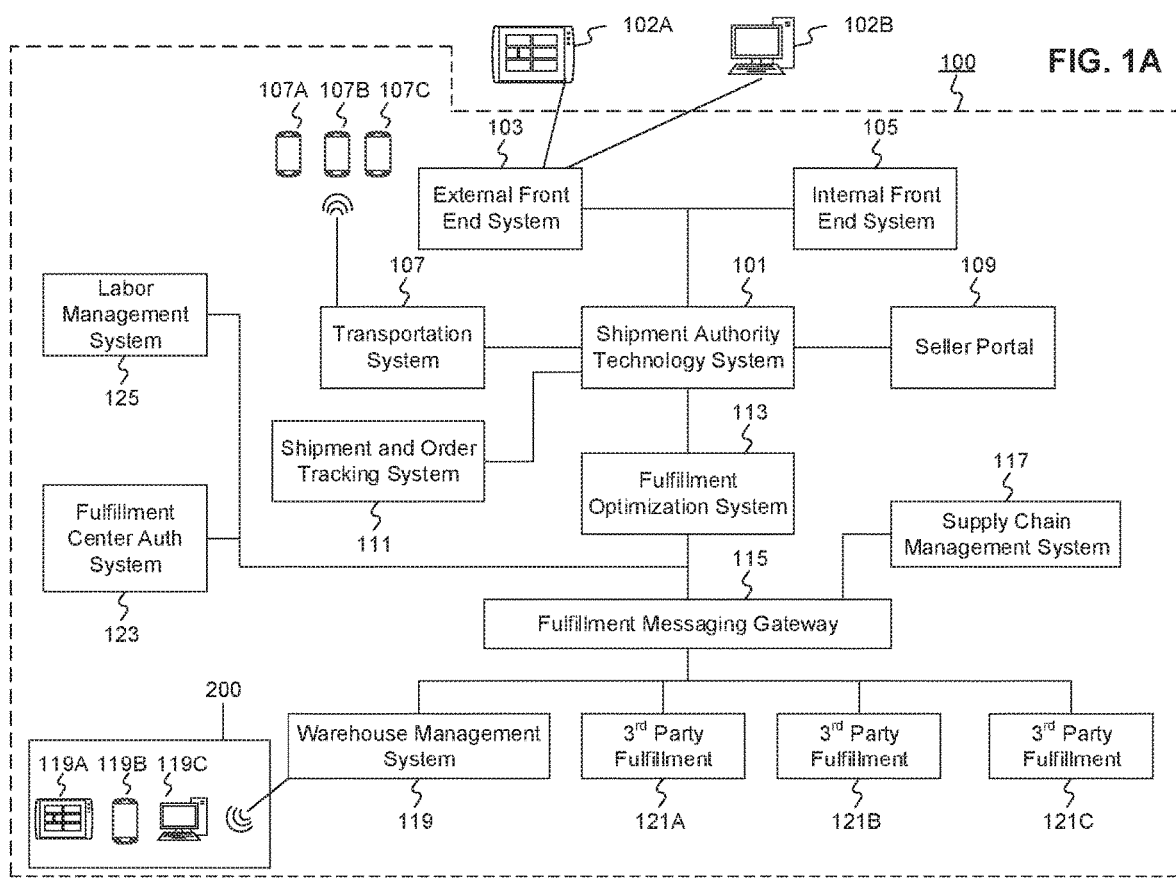
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized systems and methods configured for intelligently distributing products by determining cycle and safety stock for multiple fulfillment centers (FCs).

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
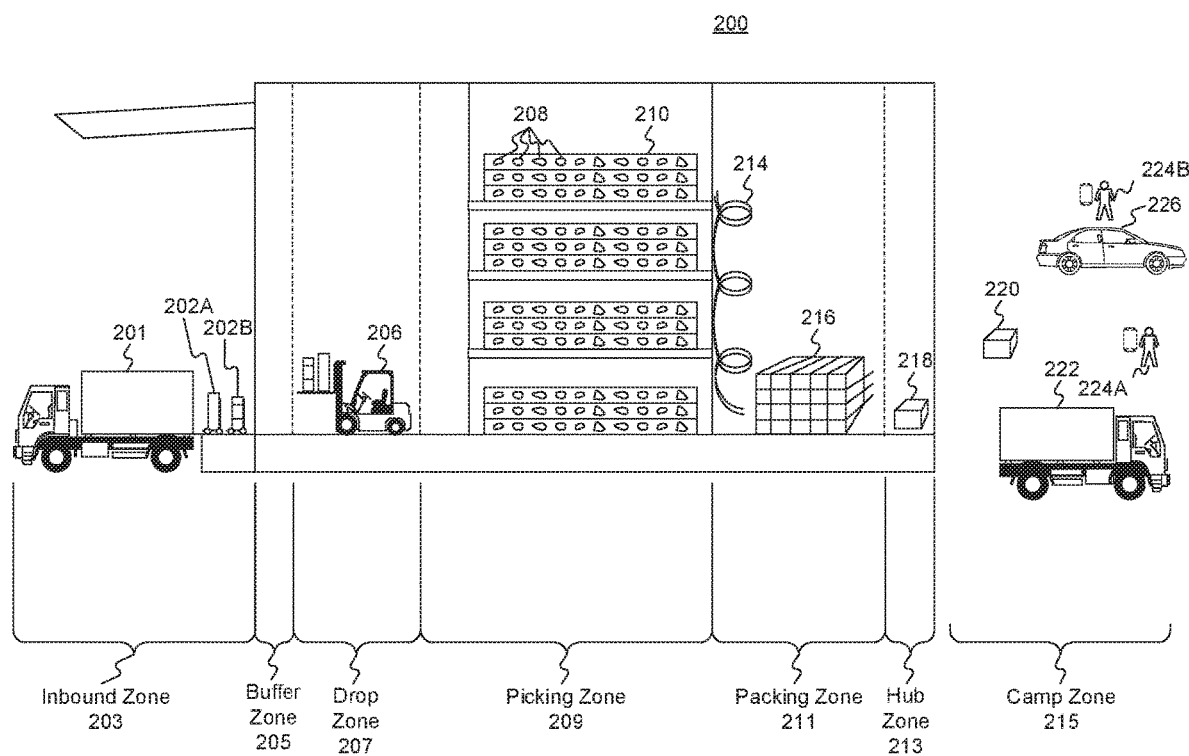
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
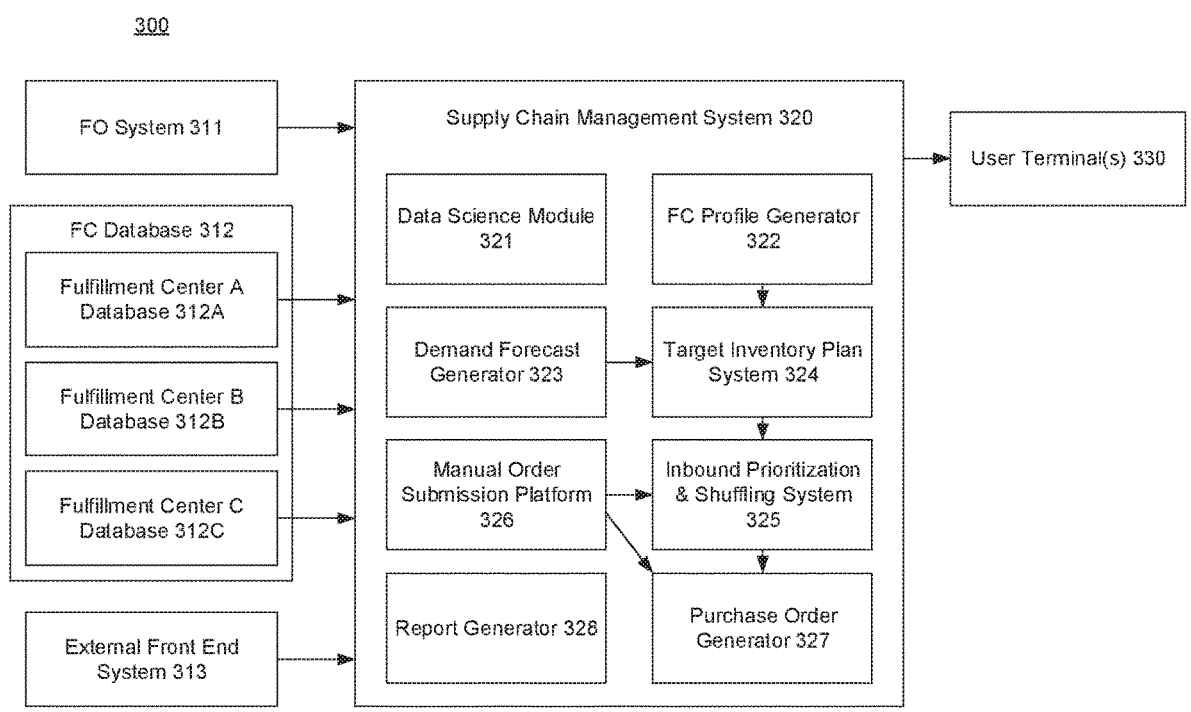
FIG. 3 is a schematic block diagram illustrating an exemplary embodiment of a networked environment comprising computerize-implemented systems for intelligent distribution of products, consistent with the disclosed embodiments.

FIG. 3 is a schematic block diagram illustrating an exemplary embodiment of a networked environment 300 comprising computerized systems for keeping product inventory at an optimum level. Environment 300 may include a variety of systems, each of which may be connected to one another via one or more networks. The systems may also be connected to one another via a direct connection, for example, using a cable. The depicted systems include an FO system 311, an FC database 312, an external front end system 313, a supply chain management system 320, and one or more user terminals 330. FO system 311 and external front end system 313 may be similar in design, function, or operation to FO system 113 and external front end system 103 described above with respect to FIG. 1A.

FC database 312 may be implemented as one or more computer systems that collect, accrue, and/or generate various data accrued from various activities at FC 200 as described above with respect to FIG. 2. For example, data accrued at FC database 312 may include, among others, product identifiers (e.g., stock keeping unit (SKU)) of every product handled by a particular FC (e.g., FC 200), an inventory level of each product over time, and frequency and occurrences of out of stock events for each product.

In some embodiments, FC database 312 may comprise FC A database 312A, FC B database 312B, and FC C database 312C, which represent databases associated with FCs A-C. While only three FCs and corresponding FC databases 312A-C are depicted in FIG. 3, the number is only exemplary and there may be more FCs and a corresponding number of FC databases. In other embodiments, FC database 312 may be a centralized database collecting and storing data from all FCs. Regardless of whether FC database 312 includes individual databases (e.g., 312A-C) or one centralized database, the databases may include cloud-based databases or on-premise databases. Also in some embodiments, such databases may comprise one or more hard disk drives, one or more solid state drives, or one or more non-transitory memories.

Supply Chain Management System (SCM) 320 may be similar in design, function, or operation to SCM 117 described above with respect to FIG. 1A. Alternatively or additionally, SCM 320 may be configured to aggregate data from FO system 311, FC database 312, and external front end system 313 in order to forecast a level of demand for a particular product and generate one or more purchase orders in a process consistent with the disclosed embodiments.

In some embodiments, SCM 320 comprises a data science module 321, an FC profile generator 322, a demand forecast generator 323, a target inventory plan system (TIP) 324, an inbound prioritization and shuffling system (IPS) 325, a manual order submission platform 326, a purchase order (PO) generator 327, and a report generator 328.

In some embodiments, SCM 320 may comprise one or more processors, one or more memories, and one or more input/output (I/O) devices. SCM 320 may take the form of a server, general-purpose computer, a mainframe computer, a special-purpose computing device such as a graphical processing unit (GPU), laptop, or any combination of these computing devices. In these embodiments, components of SCM 320 (i.e., data science module 321, FC profile generator 322, demand forecast generator 323, TIP 324, IPS 325, manual order submission platform 326, PO generator 327, and report generator 328) may be implemented as one or more functional units performed by one or more processors based on instructions stored in the one or more memories. SCM 320 may be a standalone system, or it may be part of a subsystem, which may be part of a larger system.

Alternatively, components of SCM 320 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

Data science module 321, in some embodiments, may include one or more computing devices configured to determine various parameters or models for use by other components of SCM 320. For example, data science module 321 may develop a forecast model used by demand forecast generator 323 that determines a level of demand for each product. In some embodiments, data science module 321 may retrieve order information from FO system 311 and glance view (i.e., number of webpage views for the product) from external front end system 313 to train the forecast model and anticipate a level of future demand. The order information may include sales statistics such as a number of items sold over time, a number of items sold during promotion periods, and a number of items sold during regular periods. Data science module 321 may train the forecast model based on parameters such as the sales statistics, glance view, season, day of the week, upcoming holidays, and the like. In some embodiments, data science module 321 may also receive data from inbound zone 203 of FIG. 2 as products ordered via POs generated by PO generator 327 are received. Data science module 321 may use such data to determine various supplier statistics such as a particular supplier's fulfillment ratio (i.e., a portion of products that are received in a saleable condition compared to an ordered quantity), an estimated lead time and shipping period, or the like. Data science module 321 may receive, on a recurring or periodic basis, data from FC database 312. This data may include, for example, data, product identifiers (e.g., SKUs) of every product handled by a particular FC (e.g., FC 200), an inventory level of each product over time, and frequency and occurrences of out of stock events for each product. FC profile generator may then generate a profile for each FC based on the parameters received by data science module 311. Generating the profile may, in some embodiments, aggregating the data and parameters received from FC database into a one or more sets of data, where the profile is comprised of the one or more sets of data.

Demand forecast generator 323, in some embodiments, may include one or more computing devices configured to forecast a level of demand for a particular product using the forecast model developed by data science module 321. More specifically, the forecast model may output a demand forecast quantity for each product, where the demand forecast quantity is a specific quantity of the product expected to be sold to one or more customers in a given period (e.g., a day). In some embodiments, demand forecast generator 323 may output demand forecast quantities for each given period over a predetermined period (e.g., a demand forecast quantity for each day over a 5-week period). Each demand forecast quantity may also comprise a standard deviation quantity (e.g., ±5) or a range (e.g., maximum of 30 and minimum of 25) to provide more flexibility in optimizing product inventory levels.

FC profile generator 322, in some embodiments, may include one or more computing devices configured to generate a profile for each FC in the system (e.g., FCs A, B, C) using a model developed by data science module 321. More specifically, the profile model may output, for each FC, an inbound capacity representing the quantity of a SKU that the FC may receive in a specified amount of time, an outbound capacity representing the quantity of a SKU that the FC may deliver in a specified amount of time, a quantity representing the current inventory of the SKU at the FC, and a quantity of currently ordered SKUs at each FC. These traits may be based on historical data representing the operations of each FC that may indicate the capabilities of each FC regarding the inbound and outbound flows of one or more SKUs.

Target Inventory Plan (TIP) system 324, in some embodiments, may include one or more computing devices configured to determine a recommended order quantity for each product. TIP 324 may determine the recommended order quantity by first determining preliminary order quantities for the products and constraining the preliminary order quantities with real-world constraints.

TIP 324 may receive a demand forecast quantity for each product from demand forecast generator 323. In some embodiments, the demand forecast quantities may be in the form of a table of numerical values organized by SKU in one dimension and number of units forecasted to be sold for a given day in the other dimension. The table may also comprise additional dimensions devoted to other parameters of the demand forecast quantity such as standard deviation, maximum, minimum, average, or the like. Alternatively, the demand forecast quantities may take the form of multiple arrays of values organized by SKU and dedicated to each parameter. Other suitable forms of organizing the same data are equally applicable as known in the art and are within the scope of this invention.

In some embodiments, TIP 324 may receive, from data science module 321, supplier statistics data of one or more suppliers that supply the products. The supplier statistics data may comprise a set of information (e.g., fulfillment ratio described above) associated with each supplier. In some embodiments, there may be multiple sets of supplier statistics data for a particular supplier where each set of data is associated with a particular product supplied by the supplier.

TIP 324 may also receive, in some embodiments, from FC profile generator 322, a profile including the inbound capacity, outbound capacity, current product inventory levels and currently ordered quantities of each SKU. The current product inventory level may refer to an instantaneous count of a particular SKU at the time of data retrieval, and the currently ordered quantity may refer to a total quantity of a particular product that has been ordered through one or more POs generated in the past and is waiting for delivery to corresponding FCs.

TIP 324 may determine recommended order quantities for each product by determining preliminary order quantities for each product and reducing the preliminary order quantities based on a range of parameters. In some embodiments, a preliminary order quantity for a particular product may be a function of at least one of its demand forecast quantity, a coverage period, a safety stock period, current inventory level, currently ordered quantity, a critical ratio, and a case quantity. For example, TIP 324 may determine a preliminary order quantity with formula (1):

$$Q_p = \text{ceiling}\left(\frac{\left(\sum_{n=0}^{P_c+P_s-1} Q_{fn}\right) - Q_c - Q_o}{C}\right) \cdot C \quad (1)$$

where $Q_p$ is a preliminary order quantity for a particular product; $Q_{fn}$ is a demand forecast quantity of the product for nth day from the time of calculation; $Q_c$ is the current inventory level of the product; $Q_o$ is the currently ordered quantity; $P_c$ is the coverage period; $P_s$ is the safety stock period; and C is the case quantity.

As used herein, a coverage period may refer to a length of time (e.g., number of days) one PO is planned to cover; and a safety stock period may refer to an additional length of time (e.g., additional number of days) the PO is should cover in case of an unexpected event such as a sudden increase in demand or a delayed delivery. For example, given the following table of sample demand forecast quantities for product X, a coverage period for a PO generated at D-day may be 5 and a safety stock period may be 1, in which case, $\sum_{n=0}^{P_c+P_s-1} Q_{fn}$ would equal 37+37+35+40+41+34=224.

TABLE 1

| Sample demand forecast quantity for product X over 9 days | | | | | | | | | |
|---|---|---|---|---|---|---|---|---|---|
| Forecast | D | D + 1 | D + 2 | D + 3 | D + 4 | D + 5 | D + 6 | D + 7 | D + 8 |
| $Q_f$ | 37 | 37 | 35 | 40 | 41 | 34 | 37 | 39 | 41 |

From this quantity, 224 units of product X, TIP 324 may subtract the current inventory level (e.g., 60 units) and the currently ordered quantity (e.g., 40), which comes out to be 124 units. This number may then be rounded up to a multiple of the case quantity (i.e., the number of units that the product comes packaged in such as the number of units in a box or a pallet) by being divided by the case quantity, being rounded up to an integer, and being multiplied by the case quantity again, which, in this example, comes out to be 130 units assuming a case quantity of 10 as an example.

In some embodiments, the coverage period may be a predetermined length of time equal to or greater than an expected length of time a corresponding supplier may take to deliver the products from the date of PO generation. Additionally or alternatively, TIP 324 may also adjust the coverage period based on other factors such as the day of the week, anticipated delay, or the like. Furthermore, the safety stock period may be another predetermined length of time designed to increase the preliminary order quantity as a safety measure. The safety stock period may reduce the risk of running out of stock in case of unexpected events such as a sudden increase in demand or an unanticipated shipping delay. In some embodiments, TIP 324 may set the safety stock period based on the coverage period, where, for example, a safety stock period of 0 days is added when a coverage period is 1-3 days, 1 day is added when a coverage period is 4-6 days, and 3 days are added when a coverage period is greater than 7 days.

Despite the complex process of determining the preliminary order quantities described above, the preliminary order quantity may be based primarily on customer demand and not take real-world constraints into account. Steps for accounting for such constraints are thus desired in order to optimize product inventories. TIP 324, in some embodiments, may adjust the preliminary order quantities using a set of rules configured to fine tune the preliminary order quantities based on data such as sales statistics, the current product inventory levels and the currently ordered quantities.

The resulting quantities, recommended order quantities, may be transmitted to PO generator 327. In other embodiments, the resulting quantities may be further processed by IPS 325 to prioritize particular products and/or distribute the quantities to one or more FCs as described below with respect to FIG. 4.

In addition, IPS 325, in some embodiments, may include one or more computing devices configured to determine a popularity for each product, prioritize the order quantity based on the determined popularity, and distribute the prioritized order quantity to one or more FCs 200. The processes for determining the popularity, prioritizing, and distributing products are described below in more detail with respect to FIG. 4.

Manual order submission platform 326, in some embodiments, may include one or more computing devices configured to receive user inputs for one or more manual orders. Manual order submission platform 326 may comprise a user interface accessible by a user via one or more computing devices such as internal front end system 105 of FIG. 1A. In one aspect, the manual orders may include extra quantities of certain products that the user may deem necessary and allow manual adjustments (e.g., increasing or decreasing by a certain amount) of the preliminary order quantities, the recommended order quantities, the prioritized order quantities, or the distributed order quantities. In another aspect, the manual orders may include a total quantity of certain products that should be ordered as determined by an internal user instead of the order quantities determined by SCM 320. An exemplary process of reconciling these user-determined order quantities with SCM-generated order quantities is explained below in more detail with respect to FIG. 5. Still further, a user may specify, in some embodiments, a particular FC as a receiving location so that the manual orders may get assigned to the particular FC. In some embodiments, portions of the order quantities submitted via manual order submission platform 326 may be marked or flagged (e.g., by updating a parameter associated with the portion of the order quantity) so that they may not be adjusted (i.e., constrained) by TIP 324 or IPS 325.

In some embodiments, manual order submission platform 326 may be implemented as a computer or computers running software such as the Apache HTTP Server, Microsoft Internet Information Services (IIS), NGINX, or the like. In other embodiments, manual order submission platform 326 may run a custom web server software designed to receive and process user inputs from one or more user terminals 330 and provide responses to the received user inputs.

PO generator 327, in some embodiments, may include one or more computing devices configured to generate POs to one or more suppliers based on the recommended order quantities or results of the distribution by IPS 325. SCM 320, by this point, would have determined a recommended order quantity for each product that requires additional inventory and for each FC 200, where each product has one or more suppliers that procure or manufacture the particular product and ship it to one or more FCs. A particular supplier may supply one or more products, and a particular product may be supplied by one or more suppliers. When generating POs, PO generator 327 may issue a paper PO to be mailed or faxed to the supplier or an electronic PO to be transmitted to the same.

Report generator 328, in some embodiments, may include one or more computing devices configured to generate reports periodically in response to a predetermined protocol or on-demand in response to user inputs via, for example, user terminals 330 or internal front end system 105 of FIG. 1A. The reports may range from simple ones that output certain information such as the recommended order quantity for a particular product to complex ones that require analysis of historical data and visualize such information in a graph. More specifically, report generator 328 may generate reports including information such as how order quantities changed from the forecasted quantities to final quantities at each step of the adjustments performed by SCM 320; a history of how much resources at each FC 200 were utilized; differences between the forecasted quantities and the final quantities (i.e., quantities that had to be reduced from the forecasted quantities in order to account for real-world limitations) by product category; and the like.

User terminals 330, in some embodiments, may include one or more computing devices configured to enable internal users such as those working at an FC 200 to access SCM 320 via manual order submission platform 326 or report generator 328. User terminals 330 may include any combination of computing devices such as personal computers, mobile phones, smartphones, PDAs, or the like. In some embodiments, the internal users may use user terminals 330 to access a web interface provided by manual order submission platform 326 in order to submit one or more manual orders.

Figure 4:
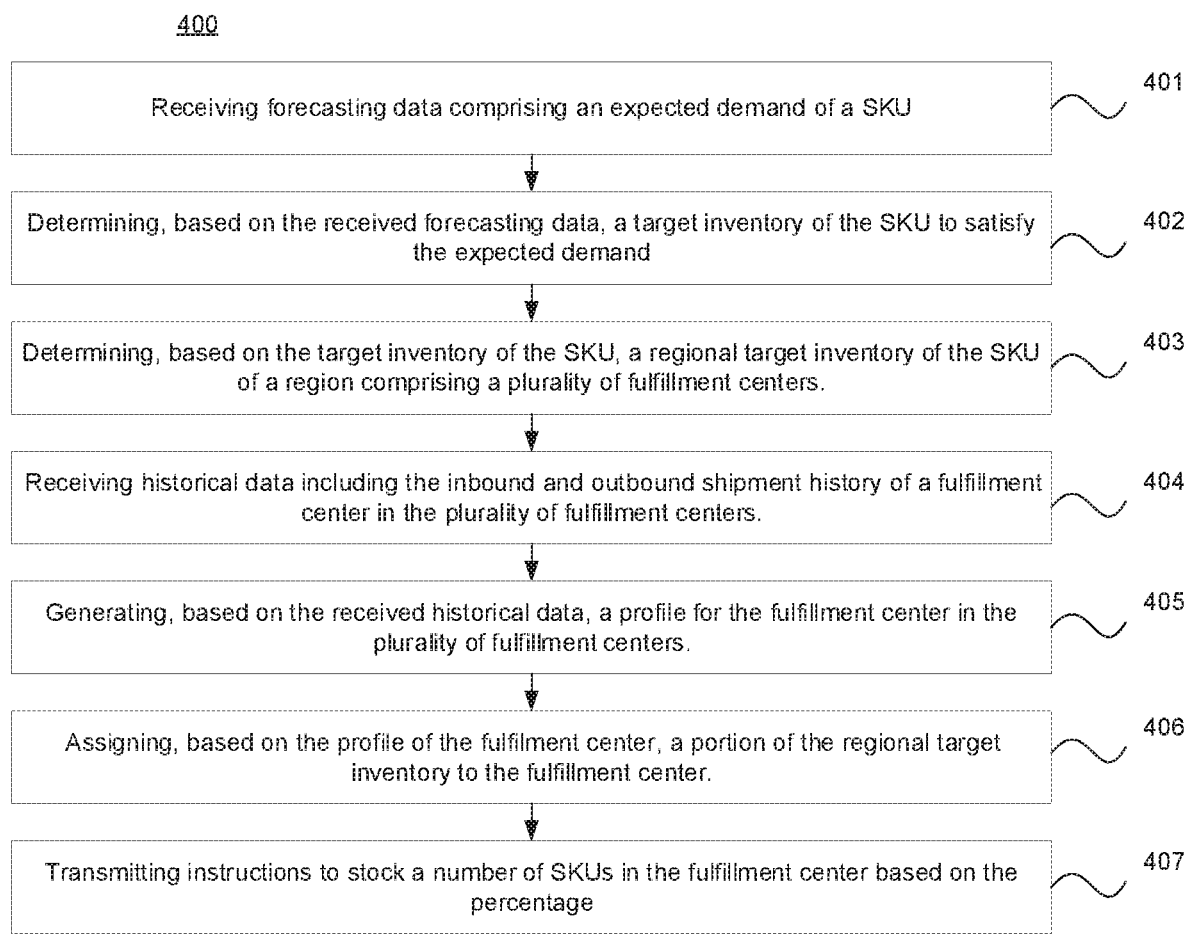
FIG. 4 is a flowchart of an exemplary computerized process for intelligently distributing products by determining cycle and safety stock for multiple fulfillment centers (FCs), consistent with the disclosed embodiments.

FIG. 4 is a flowchart of an exemplary computerized process 400 for intelligently distributing products by determining cycle and safety stock for multiple FCs (e.g., FC 200). In preferred embodiments, process 400 may be executed by one or more components of SCM 320, such as TIP 324 and IPS 325. Thus, by way of example, process 400 is described as being executed by TIP 324 and IPS 325. However, process 400 or a portion thereof may be performed by the network environment 300 as a whole or by any component of environment 300 capable of performing at least a portion of the process (e.g., one or more processors, FC Profile Generator 322, Demand Forecast Generator 323, etc.).

Process 400 begins at step 401. In step 401, TIP system may receive forecasting data comprising an expected demand of a stock keeping unit (SKU), for example. The forecasting data may be a forecasted demand quantity of a specific SKU generated by forecast generator 322 using a forecast model developed by data science module 321. The demand quantity may also include parameters such as a standard deviation, maximum, minimum, average, or the like.

After step 401 has been completed, process 400 may then continue to step 402. At step 402, TIP 324 may determine a target inventory of the SKU based on the received forecasting data, for example. The target inventory may, in some embodiments, be a quantity of the SKU calculated by ITIP 324, and may include a quantity of the SKU equal to the forecasted demand quantity generated by forecast generator 322 as well as an additional quantity calculated to cover situations where the actual demand for the SKU exceeds the expected demand. For example, the target inventory may include a cycle stock for the SKU. A cycle stock of the SKU may be a quantity of the SKU that is expect to or will likely meet the demand with a substantial certainty. For example, the cycle stock could be an amount of the SKU that will meet the demand for a substantial portion (e.g., 80%, 90%, or 95%) of time. The degree of certainty may be flexible and may be determined based on any number of reasons. The cycle stock may be based on data received from the forecast generator 322 and may be further based on parameters such as standard deviations, maximums, minimums, or averages, or the like.

In many situations, however, the cycle stock may not be sufficient to meet the actual demand of a SKU. In order to address ensure customer demand is fulfilled in these situations, the target inventory may, in some embodiments, also include a minimum amount of overstock, or safety stock, in addition to the cycle stock. The safety stock may be set based on fundamental supply chain models. For example, the safety stock calculated may be based on a critical ratio that is used to set a certain inventory level that sufficiently balances the risk of running out of stock (OOS) and overstocking of the SKU. While OOS can result in a loss of revenue due to the loss of sales, overstocking may also result in loss of revenue due to additional capital spent on the overstocked SKU as well as storage expenses. Therefore, in preferred embodiments, TIP 324 may calculate the safety stock in order to reduce the risks of OOS and overstock as much as possible.

After step 402 has been completed, process 400 may then continue to step 403. At step 403, TIP 324 may determine a regional target inventory of the SKU of a region including a plurality of fulfillment centers (e.g., FC 200) based on the target inventory of the SKU, for example. Similar to the cycle stock and safety stock of target inventory previously discussed, the regional target inventory may also include a regional cycle stock and a regional safety stock for the SKU. In some embodiments, the regional target inventory, including the regional cycle stock and the regional safety stock, may be determined by multiplying the previously determined target inventory, cycle stock, and/or safety stock by the portion of the national and/or global customer population corresponding to the region. For example, a region containing half of a nation's customer population may have a regional target inventory that is half of the national target inventory. In other embodiments, the regional target inventory, the regional cycle stock, and regional safety stock may be determined based on parameters specific to the region, such as statistics representing the historical or likely demand for one or more SKUs in the region in comparison to other regions.

After step 403 has been completed, process 400 may then continue to step 404. At step 404, TIP 324 may receive historical data including the inbound and outbound shipment history of a fulfillment center in the plurality of fulfillment centers, for example. The inbound shipment history may include a quantity of one or more SKUs that the FC has received in a specified period of time or throughout its entire history. Similarly, the outbound shipment history may include a quantity of one or more SKUs the FC has shipped in a specified period of time or throughout its entire history. In some embodiments, the received historical data may, in some embodiments, also include other miscellaneous shipping data, such as average inbound and outbound volumes of SKUs, the standard deviation or variance of the inbound and outbound volumes of the SKUs, identifiers of third party sellers and/or suppliers of the SKUs, delivery locations of the SKUs, etc.

After step 404 has been completed, process 400 may then continue to step 405. At step 405, TIP 324 may generate a profile for the FC based on the received historical data, for example. The generated FC profile may include data and/or characteristics of the FC, such as an inbound capacity of the FC, an outbound capacity of the FC, a current inventory of one or more SKUs at the FC, a list of current orders of SKUs to be shipped to the FC, a list of current orders to be shipped from the FC, etc. In preferred embodiments, the FC profile will contain any information, including but not limited to the information described above, that may be useful in determining a desired inventory level, volume of inbound and/or outbound shipments, an individual cycle and/or safety stock for the FC, etc. In general, the profile may contain any information related to the history, capabilities, and/or characteristics of the particular FC.

Based on the described parameters above, TIP 324 may calculate the ending inventory target for a specified time period, such as a week, for inclusion in the generated profile. Accordingly, generating the profile may be a step that occurs periodically, such as once every week, or it may include continuously updating and maintaining a generated profile based on changes in the received historical data. For example, TIP 324 may determine an ending inventory target with formula (2):

$$I_{end}=I_0+Q_{in}-Q_{out} \qquad (2)$$

where $I_{end}$ is the ending inventory target, $I_0$ is the initial inventory at the beginning of the specified period, $Q_{in}$ is the forecasted inbound quantity of the SKU for the FC, and $Q_{out}$ is the forecasted outbound quantity of the SKU for the FC. In some embodiments, the profile may also represent a value representing an inventory buildup target for the particular FC. The inventory buildup may be an additional inventory allocation for certain FCs, independent of and in addition to their outbound demand quantity. This additional inventory buildup quantity may be used to account for certain situations, such as peak days and gaps in supply (e.g., supplier holidays), building up inventory for new FCs before the begin delivering to customers, and other special scenarios. By including this quantity for additional inventory allocation, the number of deliveries from the supplier may be reduced and inventory management of the FCs may be optimized.

The inventory buildup target may be calculated based on at least the received historical data or the parameters defined above. For example, based on the national outbound forecast, TIP 324 may acquire a national inbound forecast. Based on the national level forecasts, TIP 324 may also determine the inbound and outbound forecasts for the FC. The inbound forecast for the FC may be determined by adding the additional inventory required to support the forecasted demand from that FC to the current inventory buildup planned at the FC. The planned inventory buildup may also depend on the inbound capacity of the FC.

After step 405 has been completed, process 400 may then continue to step 406. At step 406, IPS 325 may assign a portion of the regional target inventory to the fulfillment center based on the profile of the fulfillment center, for example. Assigning a portion of the regional target inventory may include assigning a specific quantity or percentage of the regional target inventory to each FC in the plurality of FCs so that all of the regional target inventory is assigned to at least one FC. An assignment of a portion of the regional target inventory to a particular may indicate that the FC must maintain or aim to maintain a current inventory corresponding to the FC's respective assigned portion. IPS 325 may assign the portion of the region target inventory periodically, such as once a week, or may update the assigned portion continuously based on changes in the received forecasting data, changes in the target inventory and/or regional target inventory, changes in the profile of the fulfillment center, etc.

In some embodiments, assigning a portion of the regional target inventory may be further based on a determination that a SKU should be in multiple FCs. For example, IPS 325 may determine that one FC in the plurality of FCs does not have the inbound and/or outbound capacity to maintain all of the regional target inventory for a particular region. In some embodiments, this determination may be based on the popularity of the SKU in the region. For example, one FC may have the capacity to maintain the entire region's cycle stock but does not have the capacity to maintain the safety stock required to maintain the entire regional target inventory. In this example, the FC's lack of sufficient inbound or outbound capacity may be a result of the SKUs being too popular for the FC to meet the regional demand. In a similar example, the FC may only have the capacity to maintain a portion of the cycle stock or the safety stock. Based on the incapacity of one FC to maintain the required regional target inventory of the SKU, for example, IPS 325 may determine that the SKU should be in multiple FCs in the region and assign portions of the target inventory to separate FCs accordingly.

In some embodiments, assigning a portion of the regional target inventory may further be based on an aggregate of generated profiles for each fulfillment center in the plurality of fulfillment centers. This may be necessary in many situations, such as the above described examples, where IPS 325 must additionally take into account the inbound capacities, outbound capacities, current inventories, and other characteristics of each FC in order to make the most efficient determination of how many SKUs should be assigned to each FC in the region. Basing the portion assignment on the aggregate generated profiles may include, for example, using one or more of the above-mentioned factors to determine an optimized portion of the regional target inventory for each FC through a set of rules, an algorithm, or the like. In some embodiments, IPS 325 may utilize one or more of the above-described methods to determine a ratio of SKUs for each FC relative to the regional target inventory and assign a portion of the regional target inventory to each FC based on each FC's determined ratio. The above-mentioned optimized portions or ratios may be determined periodically or updated on a continuing basis.

In some embodiments, IPS 325 may further be configured to consult a record of current outbound orders of the SKU, and assigning a portion of the regional target inventory is further based on the current inventory of the SKU and the current outbound orders of the SKU. The record of outbound orders may include a quantity of outbound orders associated with each FC in the region or an aggregate of each FC in the region. Similar to the expected regional demand, the record of current outbound orders may be utilized to help determine the regional target inventory, the regional cycle stock, or the regional safety stock. In some embodiments, however, outbound orders of an may be only be associated or previously assigned to a particular FC in the plurality of FCs. This may be the case, for example, when the particular FC is the only FC or one of a few FCs in the region that is capable of fulfilling a specific order of a SKU (e.g., only one FC delivers to a particular location or address within the region).

In some embodiments, assigning a portion of the regional target inventory may include determining a recommended order quantity (ROQ$_{out}$) to support the forecasted outbound demand for each SKU at each FC. For example, TIP 324 may calculate the ROQ using formula (3):

$$ROQ_{out} = Q_{out} - I_0 - Q_{ordered} \quad (4)$$

where $Q_{out}$ is the outbound forecast of the SKU at the FC, $I_0$ is the existing inventory of the SKU at the FC, and $Q_{ordered}$ is the quantity of existing open orders for the SKU mapped to the FC. Based on the calculated recommended order quantity for each FC, IPS 325 may allocate the recommended order quantities to each FC mapped from the national recommended order quantity.

If any of the national recommended order quantity remains after this allocation, IPS 324 may also allocate more SKUs to each FC based on a calculated inventory buildup requirement for each FC. Each FC may have an additional recommended order quantity (ROQ$_{buildup}$) to support the required inventory buildup. This recommended order quantity may, for example, be the difference between the ending inventory target ($I_{end}$) calculated from formula (2), for example and the expected demand quantity for the FC. Based on for each FC, IPS 325 may allocate the recommended order quantities for the required inventory buildup to each FC mapped from the remaining national recommended order quantity. If any of the national recommended order quantity remains after allocating the SKUs to each FC based on their required inventory buildup, then the remaining national recommended will be distributed to each FC as safety stock, in proportion to each FCs contribution to outbound demand.

After step 406 has been completed, process 400 may then continue to step 407. At step 407, IPS 325 may transmit instructions to a device to stock a number of SKUs in the FC based on the assigned portion, for example. In preferred embodiments, the number of SKUs to be stocked in the SKU will correspond substantially or be equal to the assigned portion of the regional target inventory of the SKU. The device may be one or more of any of the previously disclosed devices in system 100. In some embodiments, the device may be executing the functions of manual order submission platform 326 or purchase order generator 327. For example, in some embodiments, the instructions may be transmitted to manual order submission platform 326, and a user may consult the instructions when inputting manual order. In other embodiments, the instructions may be transmitted to purchase order generator 327, where the instructions may be used to generate purchase orders to a supplier associated with the SKU for shipment to the fulfillment center based on the assigned portion of the regional target inventory. Purchase order generator 327, or another device to which the instructions are transmitted, may execute these instructions and submit the purchase orders automatically, or present the purchase orders for review and manual submission.

Consistent with the present disclosure, the transmitted instructions may be instructions to maintain the current inventory of the SKU so that it remains equal to the assigned portion of the regional target inventory of the SKU, or they may be instructions to adjust the current inventory of the SKU so that it becomes equal to the assigned portion of the regional target inventory of the SKU. In some embodiments, maintaining the current inventory may include maintaining an inbound quantity of the SKU so that it remains equal to an outbound quantity of the SKU, or it may include modifying an in inbound quantity of the SKU so that it becomes equal to an outbound quantity of the SKU. Further, adjusting the current inventory may include modifying or maintaining an inbound of the SKU for the fulfillment center so that the current inventory approaches the assigned portion of the of the region target inventory of the SKU.

Figure 5:
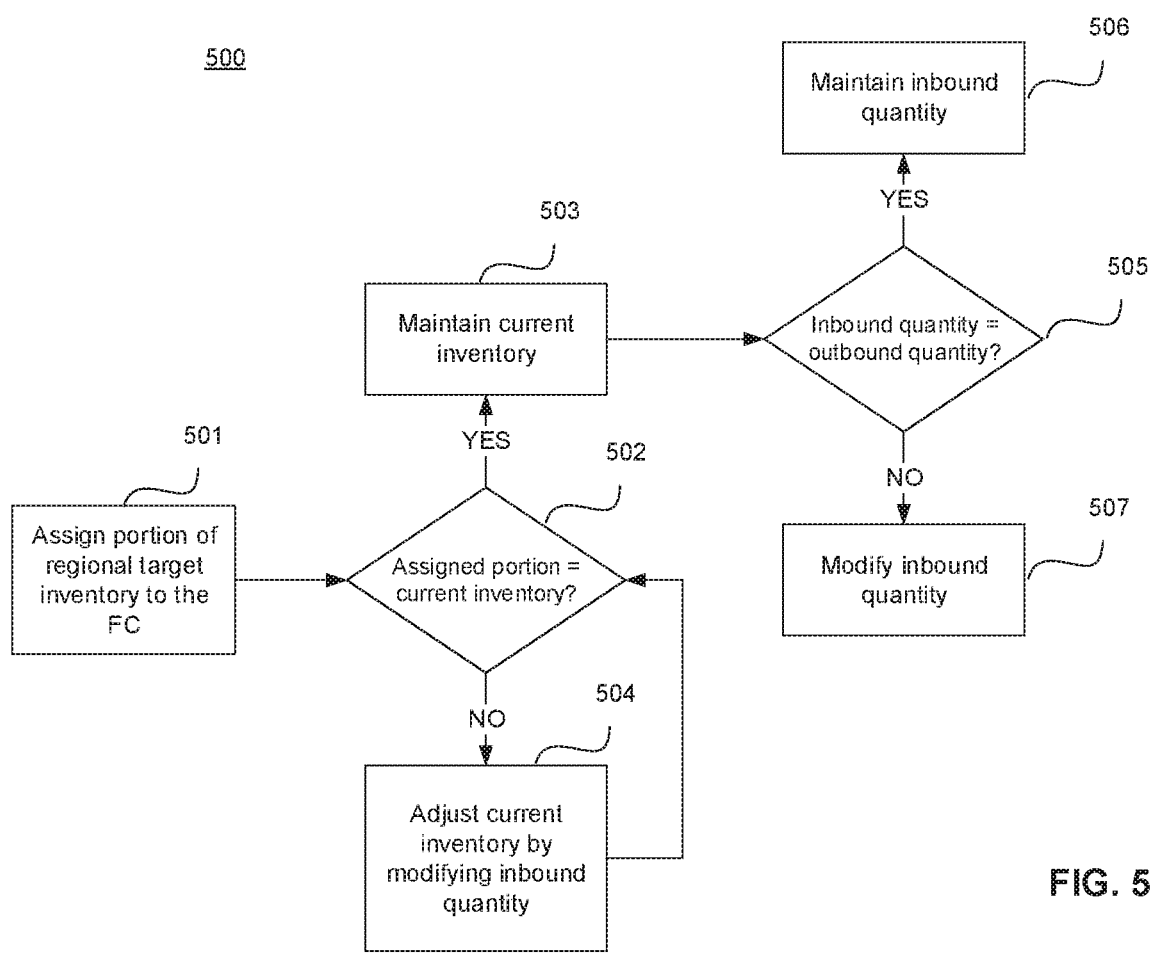
FIG. 5 is a flowchart of an exemplary computerized process for determining how to monitor and manage the current inventory products at an FC, consistent with the disclosed embodiments.

The above-mentioned embodiments may be described by way of example with reference to FIG. 5, which provides a flow chart of exemplary process and/or logic 500 that may be used to determine which instructions are to be transmitted. This process may be executed by the one or more processors of IPS 325, for example. Process 500 may begin at step 501 after IPS 325 has assigned a portion of the regional target inventory. The one or more processors may then determine at step 502 whether the current inventory of the SKU at the FC is equal to the assigned portion of the regional target inventory. This determination of whether the current inventory is "equal" to the regional target inventory may, in some embodiments, be based on the exact quantity or absolute value of the current inventory matches the exact quantity or absolute value of the regional target inventory. If the current inventory is equal to the assigned portion, then the one or more processor will transmit instructions to maintain the current inventory of the SKU at the FC at step 503. The one or more processors may further determine whether the current inbound quantity of the SKU at the FC is equal to the outbound quantity of the SKU at the FC at step 505. If so, the one or more processors may transmit instructions to the device to maintain the inbound quantity at step 506 so that the current inventory remains the same. Otherwise, the one or more processors may transmit instructions to modify the inbound quantity so that it becomes equal to the outbound quantity at step 507.

In the alternative, at step 502, the one or more processors may determine that the current inventory is not equal to the assigned portion of the regional target inventory. In this case, to prevent OOS or overstock, the one or more processors may transmit instructions to the device to modify the inbound quantity of the SKU at the FC at step 504. For example, if it is determined that current inventory is lower than the assigned portion, then the transmitted instructions may be to modify the inbound quantity of the SKU so that the inbound quantity is greater than the outbound quantity. In contrast, if the current inventory of the SKU is higher than the assigned portion, the instructions may be to modify the inbound quantity so that the inbound quantity is lower than the outbound quantity. The process may return to step 502, and the current inventory may continue to be adjusted until it is equal to the assigned portion. Further, while this process is described as an order of steps, the one or more processors may be configured to continuously assess and modify the current inventory level by continuously making the above-described determinations (e.g., at steps 502 and 505).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for intelligent distribution of products, the system comprising:
    a memory storing instructions; and
    at least one processor configured to execute the instructions for:
        retrieving, from at least one database;
            historical order information associated with a plurality of previously fulfilled orders, each previously fulfilled order comprising a stock keeping unit (SKU); and
            historical fulfillment center data comprising the inbound and outbound shipment history of each fulfillment center of a plurality of fulfillment centers in a region;
        training a data model with the historical order information to configure the data model to determine:
            statistics associated with at least one supplier of the SKU; and
            an expected demand of the SKU;
        determining, a target inventory of the SKU to satisfy the expected demand, the target inventory comprising:
            a cycle stock for the SKU; and
            a safety stock for the SKU;
        determining, based on the target inventory of the SKU, a regional target inventory of the SKU of the region, the regional target inventory comprising:
            a regional cycle stock for the SKU; and
            a regional safety stock for the SKU;
        generating, based on the received fulfillment center data and the determined statistics, a profile for each fulfillment center, the profile comprising:
            an inbound capacity;
            an outbound capacity; and
            a current inventory of the SKU;
        assigning, based on the profile of each fulfillment center, a portion of the regional target inventory to each fulfillment center; and
        stocking a number of SKUs in each fulfillment center based on the portion.

2. The system of claim 1, wherein assigning a portion of the regional target inventory is further based on a determination that a SKU should be in multiple fulfillment centers.

3. The system of claim 2, wherein the determination that a SKU should be in multiple fulfillment centers is based on the popularity of the SKU in the region.

4. The system of claim 1, wherein assigning a portion of the regional target inventory is further based on an aggregate of generated profiles for each fulfillment center in the plurality of fulfillment centers.

5. The system of claim 1, wherein the at least one processor is further configured to consult a record of current outbound orders of the SKU, and assigning a portion of the regional target inventory is further based on the current inventory of the SKU and the current outbound orders of the SKU.

6. The system of claim 1, wherein the cycle stock is an amount of the SKU determined to meet the expected demand, and the safety stock is an additional amount of the SKU determined to meet an excess of the demand.

7. The system of claim 1, wherein stocking a number of SKUs in each fulfillment center comprises one of:
maintaining the current inventory of the SKU so that it remains equal to the assigned portion of the regional target inventory of the SKU; or
adjusting the current inventory of the SKU so that it becomes equal to the assigned portion of the regional target inventory of the SKU.

8. The system of claim 7, wherein maintaining the current inventory comprises one of:
maintaining an inbound quantity of the SKU so that it remains equal to an outbound quantity of the SKU; or
modifying an inbound quantity of the SKU so that it becomes equal to an outbound quantity of the SKU.

9. The system of claim 7, wherein adjusting the current inventory comprises modifying or maintaining an inbound quantity of the SKU for the fulfillment center so that the current inventory approaches the assigned portion of the of the region target inventory of the SKU.

10. The system of claim 1, wherein stocking a number of SKUs in each fulfillment center comprises automatically generating and submitting purchase orders to the at least one supplier for shipment to the fulfillment center based on the assigned portion of the regional target inventory.

11. A computer-implemented method for intelligent distribution of products, the method comprising:
retrieving, from at least one database;
historical order information associated with a plurality of previously fulfilled orders, each previously fulfilled order comprising a stock keeping unit (SKU); and
historical fulfillment center data comprising the inbound and outbound shipment history of each fulfillment center of a plurality of fulfillment centers in a region;
training a data model with the historical order information to configure the data model to determine:
statistics associated with at least one supplier of the SKU; and
an expected demand of the SKU;
determining, a target inventory of the SKU to satisfy the expected demand, the target inventory comprising:
a cycle stock for the SKU; and
a safety stock for the SKU;
determining, based on the target inventory of the SKU, a regional target inventory of the SKU of the region, the regional target inventory comprising:
a regional cycle stock for the SKU; and
a regional safety stock for the SKU;
generating, based on the received fulfillment center data and the determined statistics, a profile for each fulfillment center, the profile comprising:
an inbound capacity;
an outbound capacity; and
a current inventory of the SKU;
assigning, based on the profile of each fulfillment center, a portion of the regional target inventory to each fulfillment center; and
stocking a number of SKUs in each fulfillment center based on the portion.

12. The computer-implemented method of claim 11, wherein assigning a portion of the regional target inventory is further based on a determination that the SKU should be in multiple fulfillment centers.

13. The computer-implemented method of claim 11, wherein assigning a portion of the regional target inventory is further based on an aggregate of generated profiles for each fulfillment center in the plurality of fulfillment centers.

14. The computer-implemented method of claim 11, wherein the at least one processor is further configured to consult a record of current outbound orders of the SKU, and assigning a portion of the regional target inventory is further based on the current inventory of the SKU and the current outbound orders of the SKU.

15. The computer-implemented method of claim 11, wherein the cycle stock is an amount of the SKU determined to meet the expected demand, and the safety stock is an additional amount of the SKU determined to meet an excess of the demand.

16. The computer-implemented method of claim 11, wherein stocking a number of SKUs in each fulfillment center comprises one of:
maintaining the current inventory of the SKU so that it remains equal to the assigned portion of the regional target inventory of the SKU; or
adjusting the current inventory of the SKU so that it becomes equal to the assigned portion of the regional target inventory of the SKU.

17. The computer-implemented method of claim 16, wherein maintaining the current inventory comprises one of:
maintaining an inbound quantity of the SKU so that it remains equal to an outbound quantity of the SKU; or
modifying an in inbound quantity of the SKU so that it becomes equal to an outbound quantity of the SKU.

18. The computer-implemented method of claim 16, wherein adjusting the current inventory comprises modifying or maintaining an inbound quantity of the SKU for the fulfillment center so that the current inventory approaches the assigned portion of the of the region target inventory of the SKU.

19. The computer-implemented method of claim 11, wherein stocking a number of SKUs in each fulfillment center comprises automatically generating and submitting purchase orders to the at least one supplier for shipment to the fulfillment center based on the assigned portion of the regional target inventory.

20. A computer-implemented system for intelligent distribution of products, the system comprising:
a memory storing instructions; and
at least one processor configured to execute the instructions for:
retrieving, from at least one database;
historical order information associated with a plurality of previously fulfilled orders, each previously fulfilled order comprising a stock keeping unit (SKU); and
historical fulfillment center data comprising the inbound and outbound shipment history of each fulfillment center of a plurality of fulfillment centers in a region;
training a data model with the historical order information to configure the data model to determine:
statistics associated with at least one supplier of the SKU; and
an expected demand of the SKU;
determining a target inventory of the SKU to satisfy the expected demand, the target inventory comprising:

a cycle stock for the SKU; and
a safety stock for the SKU;
determining, based on the target inventory of the SKU, a regional target inventory of the SKU of the region, the regional target inventory comprising:
a regional cycle stock for the SKU; and
a regional safety stock for the SKU;
generating, based on the received fulfillment center data and the determined statistics, a profile for each fulfillment center, the profile comprising:
an inbound capacity;
an outbound capacity; and
a current inventory of the SKU;
assigning, based on the profile of each fulfillment center, a portion of the regional target inventory to each fulfillment center;
determining, based on the current inventory of the SKU and the portion, whether the current inventory of the SKU meets the assigned portion; and
based on a determination that the current inventory does not meet the assigned portion, controlling an inbound flow of a SKU at each fulfillment center until the current inventory of the SKU meets the assigned portion.

* * * * *